United States Patent [19]
Yamaguchi

[11] Patent Number: 6,097,413
[45] Date of Patent: Aug. 1, 2000

[54] COLOR IMAGE FORMING DEVICE CAPABLE OF ACHIEVING A UNIFORM AND STABLE IMAGE QUALITY FOR VARIOUS RECORDING MEDIA

[75] Inventor: Chiseki Yamaguchi, Tokyo, Japan

[73] Assignee: NEC Corporation, Tokyo, Japan

[21] Appl. No.: 08/360,069

[22] Filed: Dec. 20, 1994

[30] Foreign Application Priority Data

Dec. 21, 1993 [JP] Japan ................................. 5-322056

[51] Int. Cl.[7] .................................................. B41J 2/385
[52] U.S. Cl. .................................................... 347/115
[58] Field of Search .................................. 347/112, 115, 347/117, 118; 358/406, 447, 444, 445; 395/828

[56] References Cited

U.S. PATENT DOCUMENTS

| | | | |
|---|---|---|---|
| 4,516,135 | 5/1985 | Todoh | 346/76 |
| 4,774,528 | 9/1988 | Kato . | |
| 5,369,426 | 11/1994 | Janzadeh | 347/115 |
| 5,369,499 | 11/1994 | Yip | 358/406 |

FOREIGN PATENT DOCUMENTS

| | | |
|---|---|---|
| 0 522 793 | 1/1993 | European Pat. Off. . |
| 61-118064 | 6/1986 | Japan . |
| 1152482 | 6/1989 | Japan . |
| 3153283 | 7/1991 | Japan . |
| 3198080 | 8/1991 | Japan . |
| 4-207463 | 7/1992 | Japan . |
| 5-328131 | 12/1993 | Japan . |

OTHER PUBLICATIONS

*Electronics Engineers' Handbook, 3rd Edition.* Eds. Dondald G. Fink, and Donald Christiansen Chapter 20–33, "Television Cameras". New York: McGraw Hill, Inc., 1989.

*Primary Examiner*—N. Le
*Assistant Examiner*—Raquel Yvette Gordon
*Attorney, Agent, or Firm*—Sughrue, Mion, Zinn, Macpeak & Seas, PLLC

[57] ABSTRACT

In a color image forming device including a modification executing section 12, a recording medium indicating section 14, an optimized data section 16, and an optical system 18, the modification executing section 12 modifies the color image data into the optimized data to be stored in the optimized data section 16, in response to indication of a type of a recording medium from the recording medium indicating section 14. The optical system 18 carries out exposure in response to the data from the optimized data section 16. Thus, an image having a uniform quality is formed in color image formation on various types of recording media.

8 Claims, 4 Drawing Sheets

OPTIMIZATION BY MODIFICATION OF EXPOSURE LEVEL

OPTIMIZATION BY MODIFICATION OF γ CURVE

OPTIMIZATION BY MODIFICATION OF
EXPOSURE POSITION

OPTIMIZATION BY MODIFICATION OF
EXPOSURE TIME

COLOR IMAGE FORMING DEVICE CAPABLE OF ACHIEVING A UNIFORM AND STABLE IMAGE QUALITY FOR VARIOUS RECORDING MEDIA

BACKGROUND OF THE INVENTION

This invention relates to an image forming device using an electrophotographic process and, in particular, to a digital color image forming device using a color developer.

Recently, color image forming devices using an electrophotographic process are rapidly changed from those using an analog color image forming method based on a conventional analog copying machine into those using a digital color image forming method which carries out digital processing of color data for each color in compliance with material and process characteristics of each factor composing an image forming process and which enables a wide variety of image edition.

As regards the output on various types of recording media, which is a characteristic of the electrophotographic process, digital full-color images can be produced on thick plain paper, thin plain paper, secondary stencil paper, OHP sheets and so on.

However, it is impossible to achieve a target image quality if color images are produced on such various types of recording media under a common process condition. Most of the devices cope with this problem by selecting different conditions in each process in dependence upon the types of the recording media.

A most popular approach is to select different fixing conditions for the recording media after transfer. This includes variation of a process speed down to a transfer process and a process speed in a fixing process in dependence upon the recording media, variation of a temperature, variation of a fixing pressure, variation of a carrier angle of the recording media with respect to a fixing unit, and a combination thereof.

As another approach in a process other than the fixing process, use is made of variation of transfer pressure, and bias conditions in development, transfer and separation.

In the above-mentioned approaches which have been practiced or proposed, however, the same latent image is formed on a photosensitive member irrespective of the type of the recording medium. In most of those approaches, variation is made in the development, the transfer, or the fixing processes thereafter, particularly in the fixing process.

In the image forming technique, particularly in the electrophotographic process, image formation is generally carried out on a balance throughout the whole process. Such balance, in other words, optimization in each process is decided on the basis of standard plain paper of 64 g/m$_2$. For other recording media, optimization is carried out by uniform modification of the decided condition in each image forming process, for example, variation in fixing speed.

Specifically, for output on the OHP sheets and the thick plain paper, the fixing process is carried out at a fixing speed corresponding to a half of an ordinary process speed. However, the images formed on the OHP sheets and the thick plain paper are observed in different manners, namely, as transparent images and as reflected images, respectively. With respect to the image quality, it is insufficient to form those images under the same image forming condition. Although the fixing speeds are different between the plain paper and the OHP sheets, no difference is present in developed images formed on the photosensitive member. Because of differences in surface condition, glossiness, and chromaticity of the recording medium itself, a final image has a different image quality dependent upon the type of the recording medium. On the other hand, the above-mentioned approach using variation of the bias in each process is closely related to an environment. In addition, the variation is uniform irrespective of the content of the image. Therefore, there remains a difficulty in achieving a uniform and stable image quality for various recording media.

SUMMARY OF THE INVENTION

It is therefore an object of this invention to provide a color image forming device which can achieve a uniform and stable image quality for various recording media.

Other objects of this invention will become clear as the description proceeds.

According to an aspect of this invention, the color image forming device comprises modification executing means for modifying color image data in response to an indication of the type of a recording medium on which a color image is to be formed; recording medium indicating means for supplying the indication of the type of the recording medium to the modification executing means; optimized data storing means for storing the image data, as optimized data, after modified by the modification executing means; and optical means for carrying out exposure in accordance with the optimized data supplied from the optimized data storing means.

The color image forming device may further comprise recording medium designation input means, in which the recording medium indicating means receive an input of the type of the recording medium from the recording medium designation input means.

Alternatively, the color image forming device may further comprise recording medium type detecting means, in which the recording medium indicating means receive an input of the type of the recording medium from the recording medium type detecting means.

The modification executing means may carry out modification of a γ curve.

The modification executing means may carry out modification of an exposure level upon exposure by the optical means.

The modification executing means may carry out modification of a dot exposure position upon exposure by the optical means.

The modification executing means may carry out modification of an exposure time upon exposure by the optical means.

The modification executing means may carry out modification of a color space coordinate position.

DESCRIPTION OF THE PREFERRED EMBODIMENTS

Figure 1:
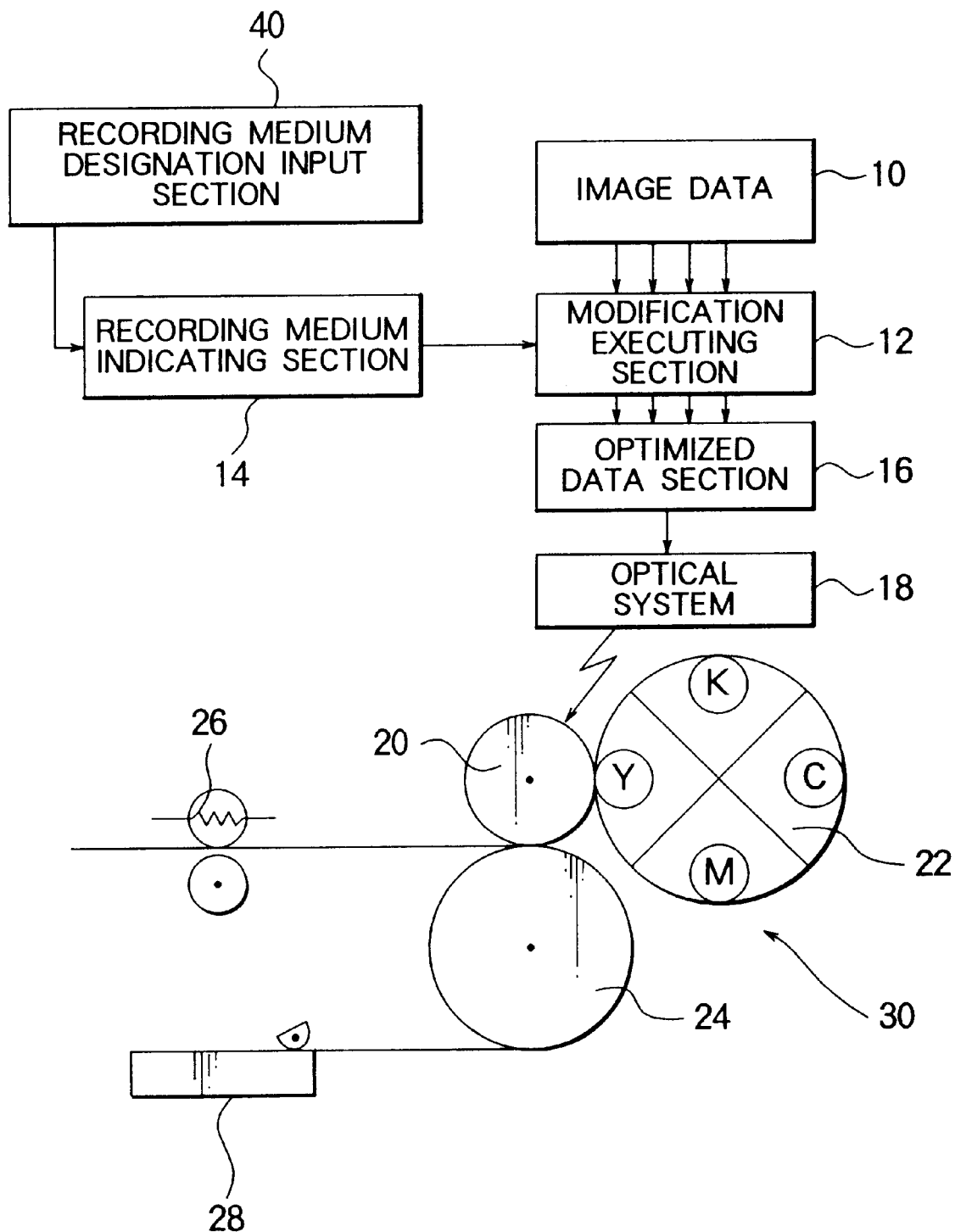
FIG. 1 is a block diagram of a color image forming device according to a first embodiment of this invention.

Referring to FIG. 1, description is, at first, made about a color image forming device according to a first embodiment of this invention.

As illustrated in FIG. 1, the color image forming device comprises a modification executing section 12, a recording medium indicating section 14, an optimized data section 16, and an optical system 18. The color image forming device further comprises a photosensitive member 20, a rotary color developing unit 22, a transfer drum 24, a fixing unit 26, and a paper feeding section 28. Generally, the photosensitive member 20, a rotary color developing unit 22, a transfer drum 24, a fixing unit 26, a paper feeding section 28, and the above-mentioned optical system 18 compose an image forming process engine 30.

The color image forming device still further comprises a recording medium designation input section 40. The recording medium designation input section 40 is in the form of a button on a panel (not shown) of the color image forming device. Alternatively, the recording medium designation input section 40 may be represented by an instruction command from a host computer (not shown). The recording medium designation input section 40 or the instruction command from the host computer is for supplying the data indicative of the type of the recording medium to the recording medium indicating section 14. The recording medium indicating section 14 receives an input of the type of the recording medium from the recording medium designation input section 40. Image data 10 are stored in the host computer or an internal image memory (not shown) in the color image forming device. The modification executing section 12 is for modifying the image data 10 into optimized data in response to an indication of the type of a recording medium on which a color image is to be formed. The recording medium indicating section 14 is for indicating the type of the recording medium to the modification executing section 12. The optimized data section 16 is for storing the data modified by the modification executing section 12. The optical system 18 is for exposing a photosensitive member in accordance with the optimized data in relation to the operation of the image forming process engine 30 prior to development by a developer of each color. The rotary color developing unit 22 comprises four-color developers.

Figure 2:
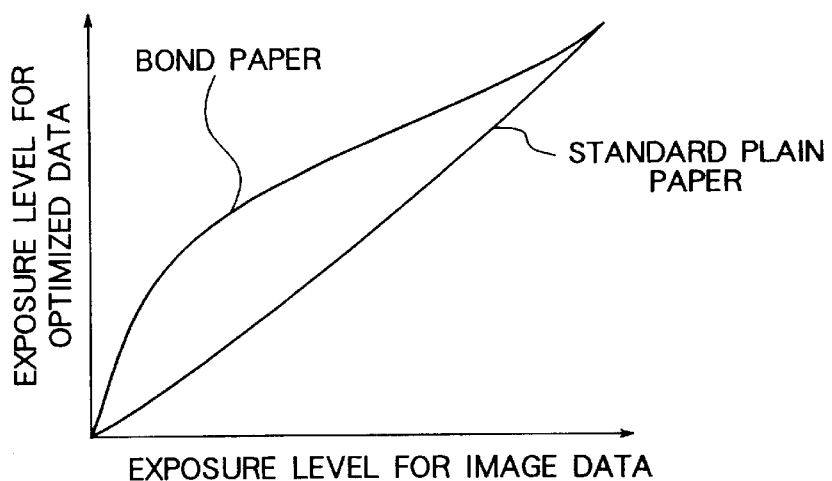
FIG. 2 is a view for describing optimization by modification of an exposure level in the color image forming device illustrated in FIG. 1.

Referring to FIG. 2 with reference to FIG. 1 continued, description will now proceed to the operation of the color image forming device according to this embodiment.

Through an operating panel (not shown) of the color image forming device, the recording medium indicating section 14 is supplied with designation of "bond paper" as the type of the recording medium. The recording medium indicating section 14 indicates, to the modification executing section 12, that the recording medium to be subjected to next image formation is the bond paper. The modification executing section 12 carries out modification of the image data in correspondence to the bond paper.

Herein, modification of the exposure level is carried out as illustrated in FIG. 2. FIG. 2 shows a relationship between the exposure level for the image data and the exposure level for the optimized data. The linear relationship of 1:1 is established for the standard plain paper. In case of the bond paper in the figure, the relationship is represented by an optimized curve considering the surface condition of the recording medium with respect to a portion of a small exposure level, namely, a portion of a low density reproduction.

In accordance with such curve, the image data are modified into optimized data for each color. The modified data are stored in the optimized data section 16 illustrated in FIG. 1. The image forming process engine 30 starts image formation. At first, the optimized data section 16 successively delivers yellow data to the optical system 18. The optical system 18 carries out exposure on the photosensitive member 20 in accordance with the yellow data to form a latent image. The developing section (rotary color developing unit 22) carries out development by the use of yellow toner.

A yellow toner image on the photosensitive member 20 is transferred to the bond paper on the transfer drum 24.

In the similar manner, toner images of magenta, cyan, and black are transferred onto the bond paper to be overlapped one after another.

The bond paper is then removed from the transfer drum 24, delivered to the fixing unit 26 for fixing, and ejected.

The color image thus formed on the bond paper has a quality similar to that formed on the standard plain paper.

Figure 3:
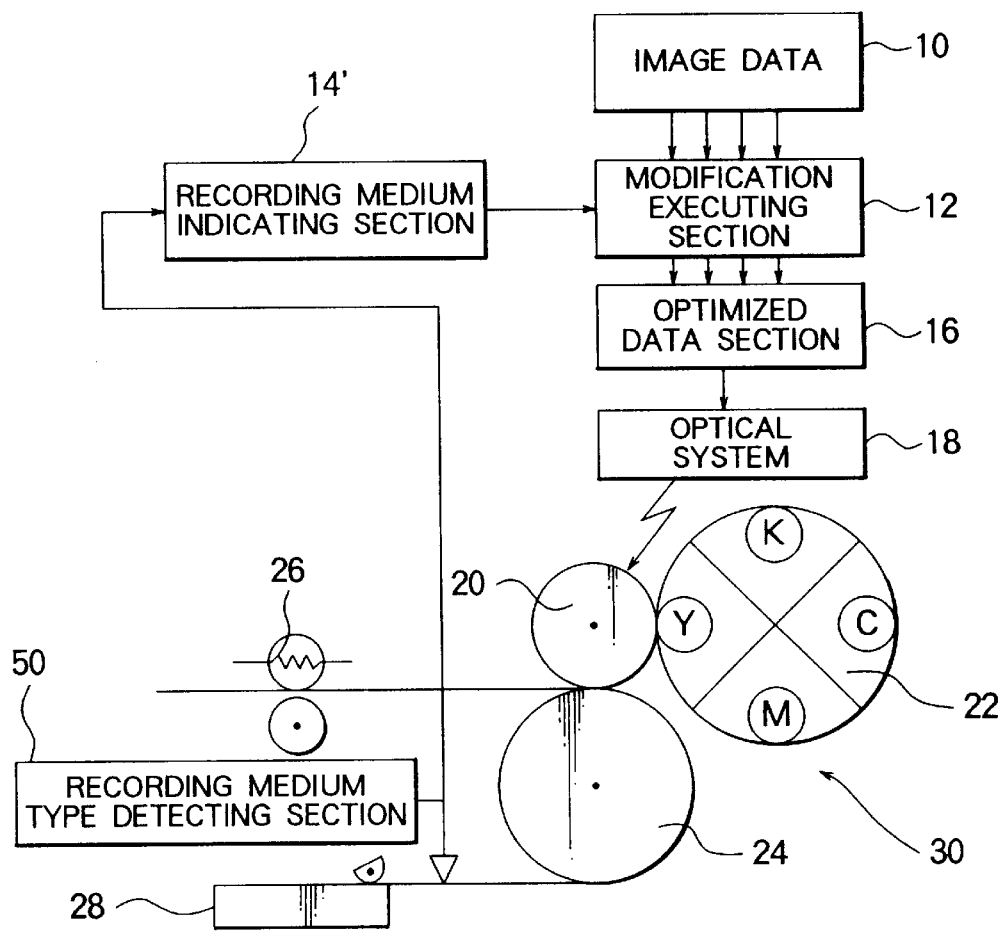
FIG. 3 is a block diagram of a color image forming device according to a second embodiment of this invention.

Referring to FIG. 3, description will proceed to a color image forming device according to a second embodiment of this invention.

The color image forming device according to the second embodiment has a structure similar to that of the first embodiment illustrated in FIG. 1 except that the data indicative of the type of the recording medium are supplied to the recording medium indicating section 14' through a recording medium type detecting section 50 which is provided near the paper feeding section 28. Similar parts are designated by the same reference numerals.

The recording medium type detecting section 50 detects, by means of an optical sensor, the transmissivity, the surface condition, and the thickness of the recording medium to be subjected to next image formation. The recording medium type detecting section 50 comprises a reference irradiation light beam emitting section, a reflected light energy detector, a transmitted light energy detector, and a reflected light beam position detector (these are not shown in FIG. 3).

Figure 4:
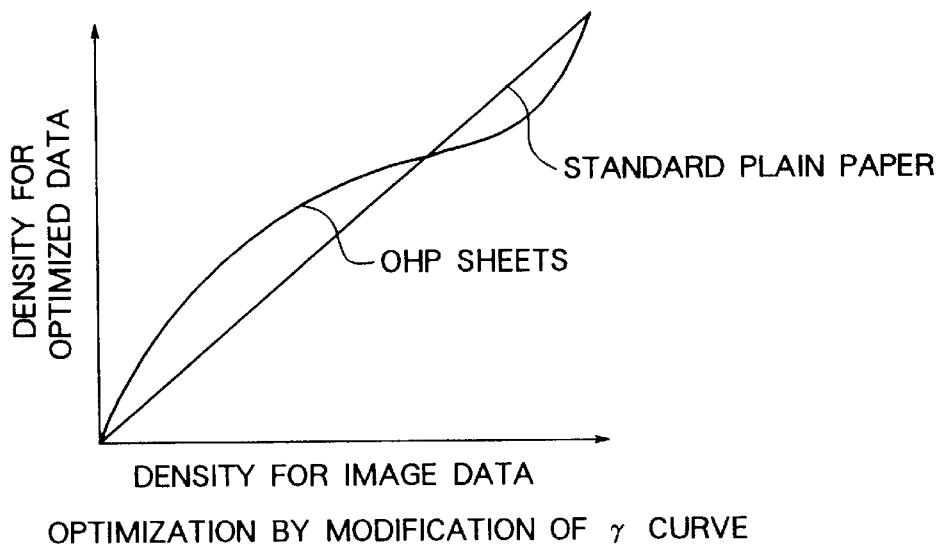
FIG. 4 is a view for describing optimization by modification of a γ curve in the color image forming device illustrated in FIG. 3.

Referring to FIG. 4 with reference to FIG. 3 continued, description will now proceed to the operation of the color image forming device according to the second embodiment.

When the color image forming device starts image formation, the recording medium is picked up through the paper feeding section 28 or a manual paper feeding section (not shown) and conveyed to a resist roller section (not shown) arranged at a location before the recording medium is carried on the transfer drum 24.

At this time, the recording medium type detecting section 50 detects the type of the recording medium.

It is assumed here that conveyance of the OHP sheet is detected. The recording medium indicating section 14' is supplied with the information that the type of the recording medium is the OHP sheet.

The recording medium indicating section 14' indicates, to the modification executing section 12, that the recording medium to be subjected to next image formation is the OHP sheet.

The modification executing section 12 carries out modification of the image data in correspondence to the OHP sheet.

Herein, modification of the γ curve is carried out as illustrated in FIG. 4. FIG. 4 shows a relationship between the density gradation LUT of the image data and the density gradation LUT of the optimized data. Like the optimization in the first embodiment, the linear relationship of 1:1 is established for the standard plain paper. In case of the OHP sheet in the figure, the relationship is represented by an S-shaped curve as an optimized curve.

In accordance with such curve, the image data are modified into the optimized data for each color to be stored in the optimized data section 16. Subsequent operations are similar to the first embodiment and will not be described any longer. In this second embodiment, the fixing unit 26 is operated at a process speed slower than that in the case of the plain paper.

Thus, the color image is formed on the OHP sheet and, when projected by transmitted light, provides an image having a quality similar to that of the color image formed on the standard plain paper.

Figure 5:
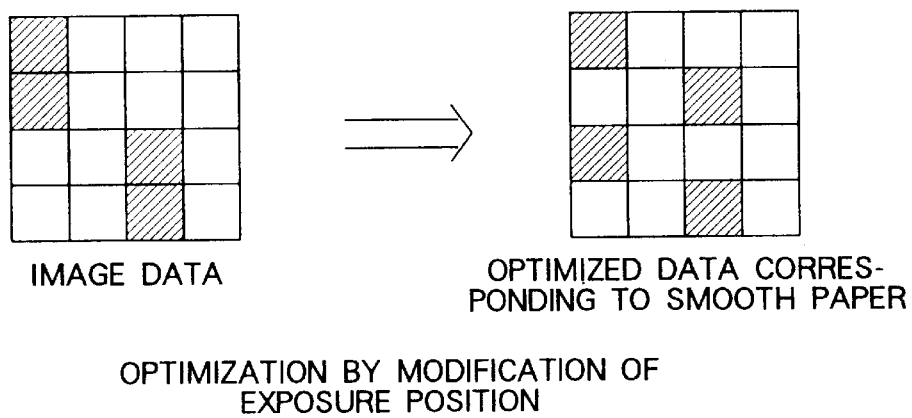
FIG. 5 is a view for describing optimization by modification of an exposure position in a color image forming device according to a third embodiment of this invention.

Referring to FIG. 5 with reference to FIG. 3 continued, description will be made as regards a color image forming device according to a third embodiment of this invention.

The color image forming device according to the third embodiment has a structure similar to that of the foregoing second embodiment, so that the description thereof is omitted. The color image forming device according to the third embodiment is different from the second embodiment only in modification of the image data into the optimized data at the modification executing section 12.

Accordingly, the operation of this embodiment will be described in conjunction with FIG. 3.

The recording medium having a smoothed surface, namely, smooth paper, is fed from the paper feeding section 28.

The recording medium type detecting section 50 detects, by means of an optical sensor, the transmissivity, the surface reflection, and the thickness. The recording medium indicating section 14' is supplied with the information that the recording medium is the smooth paper.

The recording medium indicating section 14' indicates, to the modification executing section 12, that the recording medium to be subjected to next image formation is the smooth paper.

The modification executing section 12 carries out modification of the image data in correspondence to the smooth paper.

Herein, the image data are modified with respect to the exposure position as illustrated in FIG. 5.

FIG. 5 shows a relationship between the exposure position in a basic image element matrix (herein, 4×4 image elements) in reproduction of a gradation of the image data and the exposure position in a basic image element matrix (4×4 image elements also) in accordance with the optimized data.

In case of the standard plain paper, the exposure position of the image data as depicted at the left in FIG. 5 is unchangedly used as the optimized data. On the other hand, the exposure position depicted at the right in FIG. 5 corresponds to the optimized data for the smooth paper. The modification illustrated in FIG. 5 is based on the understanding that, since the smoothed paper has a high reflectivity, fluctuation in reflectivity is reduced as a whole by a tone in which the image elements are more widely dispersed.

The above-mentioned modification of the exposure position is carried out by the modification executing section 12 for each gradation level.

Thus, the image data are modified into the optimized data to be stored in the optimized data section 16.

The subsequent operations are similar to the first embodiment.

As described above, the image having a quality similar to that of the color image formed on the standard plain paper is formed on the smooth paper.

Figure 6:
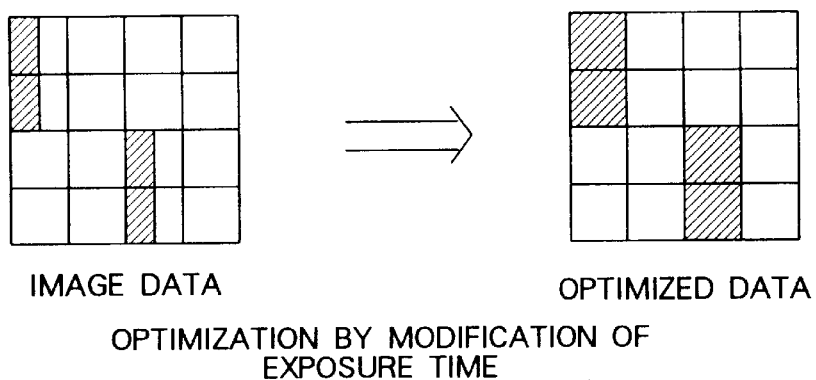
FIG. 6 is a view for describing optimization by modification of an exposure time in a color image forming device according to a fourth embodiment of this invention.

Referring now to FIG. 6 with reference to FIG. 1 continued, description will proceed to a color image forming device according to a fourth embodiment of this invention.

The color image forming device according to the fourth embodiment has a structure similar to that of the first embodiment except for a difference which also resides in modification of the image data into the optimized data at the modification executing section 12. Therefore, the operation of this embodiment will be described in conjunction with FIG. 1.

In the manner similar to the first embodiment, the recording medium indicating section 14 is supplied through the operation panel with the designation of "bond paper" as the type of the recording medium. Subsequent operation proceeds in the similar manner. The modification executing section 12 carries out modification of the image data. Herein, modification of the exposure time is carried out as illustrated in FIG. 6.

FIG. 6 shows, at the left, the exposure time at each image element of the basic image element matrix (herein, 4×4 image elements) in reproduction of the gradation of the image data, particularly in reproduction at a low density level. On the other hand, the righthand side in FIG. 6 shows the exposure time for the bond paper at each image element of the basic image element matrix in reproduction at the same low density level.

This relationship is determined taking into consideration the differences in surface condition and thickness between the bond paper and the standard plain paper.

Such modification of the exposure time is carried out at the modification executing section 12 for each gradation level. The modification for each gradation level corresponds to the exposure level modification curve in FIG. 2 described in the foregoing.

The image data are modified for each color into the optimized data to be stored in the optimized data section 16.

Thereafter, the operation proceeds in the manner similar to the first embodiment. Thus, the image having a quality similar to that of the color image formed on the standard plain paper is formed on the bond paper.

Figure 7:
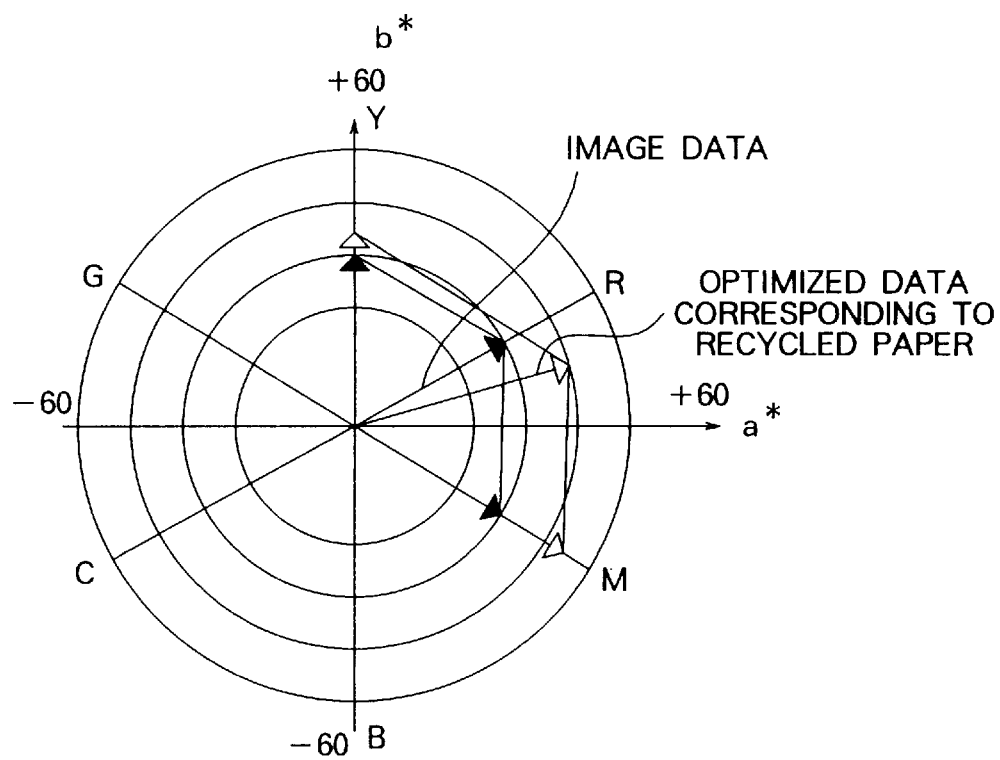
FIG. 7 is a view for describing optimization by modification of a color saturation component in a color image forming device according to a fifth embodiment of this invention.

Referring now to FIG. 7 with reference to FIG. 1 continued, description will proceed to a color image forming device according to a fifth embodiment of this invention.

The color image forming device according to the fifth embodiment has a structure similar to that of the first embodiment and is different therefrom only in modification at the modification executing section 12. Therefore, the operation of this embodiment will be described in conjunction with FIG. 1.

The recording medium indicating section 14 is supplied through the operation panel with designation of "recycled paper" as the type of the recording medium. The similar operation proceeds and the modification executing section 12 carries out modification of the image data. Herein, modification of the color space coordinate position is carried out as illustrated in FIG. 7.

FIG. 7 shows an a*b* plane of a color space coordinate according to an L*a*b* color system chromaticity diagram. In FIG. 7, black-headed arrows represent distribution ratios of Y and M for reproduction of R as image data.

However, in order to reproduce R on the recycled paper, it is necessary to modify the hue and the color saturation because the recycled paper is yellowish, poor in surface smoothness, and low in color reproduciability.

White-headed arrows represent the optimized data taking the above into consideration. The hue is biased to M and the color saturation is increased. Correspondingly, the color saturation of M is greatly increased while the color saturation of Y is slightly increased. Such modification of the color space coordinate is carried out for each color at the modification executing section 12.

The image data are thus modified and stored in the optimized data section 16.

Subsequently, the operation proceeds in the manner similar to the first embodiment. The image having a quality similar to that of the color image formed on the standard plain paper is formed on the recycled paper.

In this embodiment, modification is carried out with respect to the hue and the color saturation. It is noted here that the modification may include the brightness.

In the conventional color image forming process, the latent image is generated in a uniform manner irrespective of the type of the recording medium. This results in fluctuation in quality of the reproduced color image dependent upon the type of the recording medium. As described above, according to this invention, it is possible to considerably reduce such fluctuation in image quality.

In addition, modification of the image data can easily be achieved by the input of the type of the recording medium, such as designation of the type of the recording medium and detection of the type of the recording medium at the paper feeding section 28 prior to formation of the image.

In prior art, modification is carried out in each image forming processing section except the exposing section and is not sufficient and precise because of restriction both in material characteristic and mechanism. According to this invention, it is possible to obtain the color image of the same quality for any different type of the recording medium by modification of the γ curve, modification of the exposure level, modification of the exposure position, modification of the exposure time, and modification of the color space coordinate position.

Furthermore, this invention does not require substantial modification in structure of the device and in process. Only requirement is addition and modification in the image processing section. The content of modification at the modification executing section can be desiredly selected in correspondence to the image quality required. Thus, this invention is adaptable over a wide range of application from personal use to pre-press proof output.

While this invention has thus far been described in conjunction with only several embodiments thereof, it will readily be possible for those skilled in the art to put this invention into practice in various other manners.

For example, in the description, modification for optimization is carried out at the modification executing section 12 in several manners as illustrated in FIGS. 2 and 4 through 7. However, each of them is no more than one example of modification. Obviously, it is possible to carry out modification in any appropriate manner in correspondence to various recording media.

Moreover, instead of optimization for an individual factor, a combination of various factors may be used.

Furthermore, it will readily be understood that this invention is applicable also to the formation of a monochromatic image.

What is claimed is:

1. A color image forming device which forms images from color image data for use with different types of recording media, comprising:

modification executing means for modifying the color image data in response to an indication of a particular type of a recording medium on which a color image is to be formed, to thereby provide a modified image data;

recording medium indicating means for supplying said indication of the type of said recording medium to said modification executing means;

optimized data storing means for storing said modified image data as optimized data; and optical means for carrying out exposure in accordance with said optimized data supplied from said optimized data storing means.

2. A color image forming device as claimed in claim 1, further comprising recording medium designation input means, wherein said recording medium indicating means receives an input of the type of said recording medium from said recording medium designation input means.

3. A color image forming device as claimed in claim 1, further comprising recording medium type detecting means, wherein said recording medium indicating means receives an input of the type of said recording medium from said recording medium type detecting means.

4. A color image forming device as claimed in claim 1, wherein said modification executing means carries out modification of a γ curve.

5. A color image forming device as claimed in claim 1, wherein said modification executing means carries out modification of an exposure level upon exposure by said optical means.

6. A color image forming device as claimed in claim 1, wherein said modification executing means carries out modification of a dot exposure position upon exposure by said optical means.

7. A color image forming device as claimed in claim 1, wherein said modification executing means carries out modification of an exposure time upon exposure by said optical means.

8. A color image forming device as claimed in claim 1, wherein said modification executing means carries out modification of a color space coordinate position.

\* \* \* \* \*

UNITED STATES PATENT AND TRADEMARK OFFICE
CERTIFICATE OF CORRECTION

PATENT NO. : 6,097,413
DATED : August 1, 2000
INVENTOR(S) : Chiseki Yamaguchi

It is certified that error appears in the above-identified patent and that said Letters Patent is hereby corrected as shown below:

Column 1,
Line 52, delete "$m_2$" insert -- $m^2$ --

Signed and Sealed this

Twenty-fifth Day of September, 2001

Attest:

*Attesting Officer*

NICHOLAS P. GODICI
*Acting Director of the United States Patent and Trademark Office*